US008514058B2

(12) United States Patent
Cameron

(10) Patent No.: US 8,514,058 B2
(45) Date of Patent: Aug. 20, 2013

(54) CONSTRUCTION EQUIPMENT COMPONENT LOCATION TRACKING

(75) Inventor: John F. Cameron, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1288 days.

(21) Appl. No.: 12/193,171

(22) Filed: Aug. 18, 2008

(65) Prior Publication Data

US 2010/0039262 A1 Feb. 18, 2010

(51) Int. Cl.
*H04Q 5/22* (2006.01)

(52) U.S. Cl.
USPC .... 340/10.1; 340/8.1; 340/568.1; 340/539.13

(58) Field of Classification Search
USPC ............... 340/8.1, 586.1, 10.1, 539.13, 568.1
See application file for complete search history.

(56) References Cited

U.S. PATENT DOCUMENTS

| | | | | |
|---|---|---|---|---|
| 3,796,322 | A | | 3/1974 | Cording |
| 4,178,591 | A | | 12/1979 | Geppert |
| 4,752,012 | A | | 6/1988 | Juergens |
| 4,857,753 | A | | 8/1989 | Mewburn-Crook et al. |
| 5,095,531 | A | | 3/1992 | Ito |
| 5,224,388 | A | | 7/1993 | Pratt |
| 5,359,542 | A | | 10/1994 | Pahmeier et al. |
| 5,381,136 | A | * | 1/1995 | Powers et al. ............ 340/539.26 |
| 5,491,486 | A | | 2/1996 | Welles, II |
| 5,634,565 | A | | 6/1997 | Kesage |
| 5,640,452 | A | | 6/1997 | Murphy |
| 5,650,770 | A | | 7/1997 | Schlager et al. |
| 5,752,197 | A | | 5/1998 | Ratioula |
| 5,859,839 | A | | 1/1999 | Ahlenius et al. |
| 5,883,817 | A | | 3/1999 | Chisholm et al. |
| 5,890,091 | A | | 3/1999 | Talbot et al. |
| 5,917,405 | A | | 6/1999 | Joao |
| 5,987,379 | A | | 11/1999 | Smith |
| 6,016,117 | A | | 1/2000 | Nelson, Jr. |
| 6,046,687 | A | | 4/2000 | Janky |
| 6,052,925 | A | * | 4/2000 | Reiners ........................... 37/348 |
| 6,064,335 | A | | 5/2000 | Eschenbach |
| 6,067,031 | A | | 5/2000 | Janky et al. |
| 6,076,030 | A | * | 6/2000 | Rowe ............................. 701/50 |
| 6,118,196 | A | | 9/2000 | Cheng-Yon |

(Continued)

FOREIGN PATENT DOCUMENTS

| | | |
|---|---|---|
| GB | 2373086 | 9/2002 |
| JP | 05286692 | 11/1993 |

(Continued)

OTHER PUBLICATIONS

Abderrahim, M. et al., "A Mechatronics Security System for the Construction Site", www._elsevier.com/locate/autcon, (Sep. 7, 2004),460-466.

(Continued)

*Primary Examiner* — Benjamin C Lee
*Assistant Examiner* — Quang D Pham

(57) ABSTRACT

In a method for construction equipment component location tracking, a wireless mesh network communication is initiated between a component monitor and a component information unit which is mechanically coupled with the component. A location of the component is accessed in response to a movement of the component. The location of the component is stored within the component information unit to facilitate location tracking of the component.

18 Claims, 12 Drawing Sheets

(56) References Cited

U.S. PATENT DOCUMENTS 6,124,825 A 9/2000 Eschenbach
6,144,307 A 11/2000 Elliot
6,166,688 A 12/2000 Cromer et al.
6,243,648 B1 6/2001 Kilfeather et al.
6,268,804 B1 7/2001 Janky et al.
6,297,744 B1 10/2001 Baillargeon et al.
6,301,616 B1 10/2001 Pal et al.
6,317,500 B1 11/2001 Murphy
6,320,273 B1 11/2001 Nemec
6,330,149 B1 12/2001 Burrell
6,356,196 B1 3/2002 Wong et al.
6,362,736 B1 3/2002 Gehlot
6,377,165 B1 4/2002 Yoshioka et al.
6,439,515 B1 8/2002 Powers
6,453,237 B1 9/2002 Fuchs et al.
6,459,988 B1 10/2002 Fan et al.
6,480,788 B2 11/2002 Kilfeather et al.
6,496,766 B1 * 12/2002 Bernold et al. ................. 701/50
6,501,421 B1 12/2002 Dutta
6,505,049 B1 1/2003 Dorenbosch
6,512,465 B2 1/2003 Flick
6,539,307 B1 3/2003 Holden et al.
6,560,536 B1 5/2003 Sullivan et al.
6,609,064 B1 8/2003 Dean
6,650,242 B2 11/2003 Clerk et al.
6,651,000 B2 11/2003 Diggelen et al.
6,657,587 B1 12/2003 Mohan
6,658,336 B2 12/2003 Browne et al.
6,658,349 B2 12/2003 Cline
6,675,095 B1 1/2004 Bird et al.
6,677,938 B1 1/2004 Maynard
6,700,533 B1 * 3/2004 Werb et al. ............... 342/357.48
6,700,762 B2 3/2004 Underwood et al.
6,725,158 B1 4/2004 Sullivan et al.
6,801,853 B2 10/2004 Workman
6,804,602 B2 10/2004 Impson et al.
6,826,452 B1 11/2004 Holland et al.
6,829,535 B2 12/2004 Diggelen et al.
6,843,383 B2 1/2005 Schneider et al.
6,864,789 B2 3/2005 Wolfe
6,865,169 B1 3/2005 Quayle et al.
6,934,629 B1 8/2005 Chisholm et al.
6,970,801 B2 11/2005 Mann
6,975,941 B1 * 12/2005 Lau et al. ...................... 701/491
6,981,423 B1 1/2006 Discenzo
7,020,555 B1 3/2006 Janky et al.
7,031,883 B1 4/2006 Lee
7,032,763 B1 4/2006 Zakula, Sr. et al.
7,034,683 B2 4/2006 Ghazarian
7,050,907 B1 5/2006 Janky et al.
7,070,060 B1 7/2006 Feider et al.
7,091,851 B2 * 8/2006 Mason et al. ............ 340/539.13
7,095,368 B1 8/2006 Diggelen
7,095,370 B1 8/2006 Diggelen et al.
7,135,976 B2 * 11/2006 Neff et al. .................. 340/572.1
7,158,883 B2 1/2007 Fuchs et al.
7,212,120 B2 5/2007 Gudat
7,289,875 B2 10/2007 Recktenwald et al.
7,295,855 B1 11/2007 Larsson et al.
7,298,319 B2 11/2007 Han et al.
7,308,114 B2 12/2007 Takehara et al.
7,313,476 B2 * 12/2007 Nichols et al. .................... 701/1
7,324,921 B2 1/2008 Sugahara et al.
7,344,037 B1 3/2008 Zakula et al.
7,367,464 B1 5/2008 Agostini et al.
7,398,153 B2 7/2008 Workman et al.
7,486,174 B2 * 2/2009 Battista et al. ............. 340/425.5
7,493,112 B2 2/2009 Adachi et al.
7,548,200 B2 * 6/2009 Garin ....................... 342/357.66
7,548,816 B2 6/2009 Riben et al.
7,574,300 B2 * 8/2009 Twitchell et al. ............. 701/470
7,633,389 B2 * 12/2009 Mantovani et al. ........ 340/539.3
7,639,181 B2 12/2009 Wang et al.
7,667,642 B1 2/2010 Frericks et al.
7,710,317 B2 5/2010 Cheng et al.
7,719,416 B2 5/2010 Arms et al.
7,868,755 B2 * 1/2011 Hanai et al. .............. 340/539.22
8,164,431 B2 * 4/2012 Morgan et al. ........... 340/426.19
8,164,454 B2 * 4/2012 Teller ......................... 340/572.1
2002/0070856 A1 6/2002 Wolfe
2002/0082036 A1 6/2002 Ida et al.
2002/0117609 A1 8/2002 Thibault et al.
2002/0142788 A1 10/2002 Chawla et al.
2002/0196151 A1 12/2002 Troxler
2003/0045314 A1 3/2003 Burgan et al.
2003/0064744 A1 4/2003 Zhang et al.
2003/0073435 A1 4/2003 Thompson et al.
2003/0119445 A1 6/2003 Bromham et al.
2004/0024522 A1 2/2004 Walker et al.
2004/0034470 A1 2/2004 Workman
2004/0044911 A1 3/2004 Takada et al.
2004/0148083 A1 * 7/2004 Arakawa et al. ................ 701/50
2004/0177032 A1 * 9/2004 Bradley et al. .................. 705/38
2004/0196182 A1 10/2004 Unnold
2004/0219927 A1 11/2004 Sumner
2004/0243285 A1 12/2004 Gounder
2005/0021245 A1 * 1/2005 Furuno et al. ................... 702/33
2005/0030175 A1 2/2005 Wolfe
2005/0055161 A1 3/2005 Kalis et al.
2005/0095985 A1 5/2005 Hafeoz
2005/0103738 A1 5/2005 Recktenwald et al.
2005/0116105 A1 6/2005 Munk et al.
2005/0137742 A1 6/2005 Goodman et al.
2005/0147062 A1 7/2005 Khouaja et al.
2005/0154904 A1 7/2005 Bhargav et al.
2005/0179541 A1 8/2005 Wolfe
2005/0195101 A1 * 9/2005 Stevens et al. .................. 342/28
2005/0237154 A1 * 10/2005 Kafry et al. .................. 340/10.1
2005/0242052 A1 11/2005 O'Connor et al.
2005/0264416 A1 * 12/2005 Maurer .................... 340/539.13
2006/0027677 A1 2/2006 Abts
2006/0109106 A1 * 5/2006 Braun ...................... 340/539.13
2006/0145863 A1 * 7/2006 Martin et al. .............. 340/572.8
2006/0181452 A1 8/2006 King et al.
2006/0238309 A1 * 10/2006 Takatama ................... 340/10.41
2006/0243056 A1 * 11/2006 Sundermeyer et al. ......... 73/760
2007/0005244 A1 1/2007 Nadkarni
2007/0143207 A1 * 6/2007 Breen ............................. 705/40
2007/0202861 A1 * 8/2007 Adachi et al. .............. 455/414.2
2007/0210920 A1 * 9/2007 Panotopoulos ............ 340/572.1
2007/0255498 A1 11/2007 McDaniel et al.
2008/0014965 A1 1/2008 Dennison et al.
2008/0036617 A1 2/2008 Arms et al.
2008/0040244 A1 * 2/2008 Ricciuti et al. .................. 705/28
2008/0061959 A1 * 3/2008 Breed ........................ 340/539.1
2008/0084332 A1 4/2008 Ritter et al.
2008/0086508 A1 * 4/2008 Ballew ....................... 707/104.1
2008/0086509 A1 * 4/2008 Wallace ..................... 707/104.1
2008/0086685 A1 * 4/2008 Janky et al. ................... 715/700
2008/0100977 A1 5/2008 Shreiner et al.
2008/0103660 A1 * 5/2008 Browne et al. .................. 701/46
2008/0122234 A1 5/2008 Alioto et al.
2008/0221836 A1 * 9/2008 Tateson ......................... 702/188
2008/0221943 A1 * 9/2008 Porter et al. ...................... 705/7
2008/0238657 A1 * 10/2008 Hupp et al. ................ 340/539.1
2008/0281618 A1 * 11/2008 Mermet et al. .................... 705/1
2009/0009389 A1 1/2009 Mattos
2009/0099774 A1 * 4/2009 Takac et al. ................... 701/216
2009/0109049 A1 4/2009 Frederick et al.
2009/0134997 A1 * 5/2009 Godlewski ................. 340/539.1
2009/0189784 A1 * 7/2009 Lindgren ...................... 340/945
2009/0195356 A1 * 8/2009 Tuttle ........................... 340/10.1
2009/0295633 A1 * 12/2009 Pinto et al. ............... 342/357.14
2010/0049366 A1 * 2/2010 Lee et al. ...................... 700/258
2010/0100338 A1 4/2010 Vik et al.
2010/0127927 A1 * 5/2010 Rousset ................... 342/357.13
2010/0255781 A1 * 10/2010 Wirola et al. ................ 455/41.2
2011/0100124 A1 * 5/2011 Zadesky et al. ............ 73/514.09
2011/0267174 A1 * 11/2011 Davis ........................... 340/10.1

FOREIGN PATENT DOCUMENTS

JP 8240653 9/1996
JP 2000/048283 2/2000
JP 2000/249752 9/2000

| | | |
|---|---|---|
| JP | 2002/197593 | 7/2002 |
| JP | 2002/197595 | 7/2002 |
| JP | 2002/217811 | 8/2002 |
| WO | WO-2000/068907 | 11/2000 |
| WO | WO-02/35492 | 5/2002 |
| WO | WO-03/007261 | 1/2003 |
| WO | WO-2004/017272 | 2/2004 |
| WO | WO-2004/083888 | 9/2004 |
| WO | WO-2005/017846 | 2/2005 |
| WO | WO-2009/084820 | 7/2009 |

OTHER PUBLICATIONS

"Tower Cranes Anti-Collision and Zone Protection System", www.tac3000.com, (2004),36.

"Anti-Collision Systems A Clash of Cultures", http://www.cranestodaymagazine.com/story.asp?sectionCode=66&storyCode=2043070, (Mar. 21, 2007),6.

"Highland Man's Invention Success With Dewalt", http://www.heraldextra.com/content/view/195674/4/, (Oct. 8, 2006),3.

* cited by examiner

1200

CONSTRUCTION EQUIPMENT COMPONENT LOCATION TRACKING

CROSS REFERENCE TO RELATED APPLICATIONS

This Application is related to U.S. patent application Ser. No. 12/193,674 (now issued patent 7,911,379) by John Cameron, filed on Aug. 18, 2008, entitled "Construction Equipment Component Location Tracking,", and assigned to the assignee of the present application. To the extent not repeated herein, the contents of this related patent application are hereby incorporated herein by reference.

This Application is related to U.S. patent application Ser. No. 12/196,805 by John Cameron, filed on Aug. 22, 2008, entitled "Monitoring Crane Component Overstress,", and assigned to the assignee of the present application. To the extent not repeated herein, the contents of this related patent application are hereby incorporated herein by reference.

BACKGROUND

Construction equipment items such as cranes and excavators are typically delivered to a job site (e.g., a construction site) in multiple pieces or components. Often a construction equipment item is so specialized and/or expensive, that a contractor rents it for a particular use or job, and thus the construction equipment is supplied from a rental company, otherwise known as a "rental yard." Regardless of the source, many of these items of construction equipment, and components thereof, are expensive and require periodic inspection and maintenance to be safely assembled and operated.

Rental yards and other storage areas for construction equipment components are typically very large, often encompassing numerous acres. For example, a single tower crane may take 20-30 trucks to transport all of the required components to a job site. Thus, such components require a large storage area and may further be widely distributed about this storage area. Moreover, some construction equipment utilizes modular/interchangeable components. Some examples, with respect to a crane, include modular structural components for use in a tower, boom, jib, etc. Because of the modular/interchangeable nature of certain components, many similar or identical components are often stored within a very large storage area.

Organization and tracking of components in storage areas, and at other locations, presents challenges with regard to making certain that components are locatable, that the correct components are stored and retrieved efficiently, that the correct components are inspected as required, that the correct components are maintained as required, and that the components are assembled and operated in a safe fashion. These challenges are compounded by the presence of similar or identical components. Such challenges are not limited to storage areas, but rather, may also be faced on a job site at a manufacturing facility or elsewhere. As such, these challenges impact owners, rental operators, manufacturers, and users of construction equipment items and components.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a method for construction equipment component location tracking, a wireless mesh network communication is initiated between a component monitor and a component information unit which is mechanically coupled with the component. A location of the component is accessed in response to a movement of the component. The location of the component is stored within the component information unit to facilitate location tracking of the component.

BRIEF DESCRIPTION OF THE DRAWINGS

The accompanying drawings, which are incorporated in and form a part of this application, illustrate embodiments of the subject matter, and together with the description, serve to explain the principles of the subject matter. Unless noted, the drawings referred to in this description should be understood as not being drawn to scale.

DETAILED DESCRIPTION

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and modules described herein are implemented in hardware, circuitry, firmware, computer-executable instructions, logic devices, or some combination thereof. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present detailed description, discussions utilizing terms such as "sensing," "initiating," "accessing," "storing," "providing," "communicating," "identifying," "performing," "communicating," "receiving," "utilizing," "transferring," "associating," "displaying," "transmitting," or the like, refer to the actions and processes of a computer system or similar electronic computing device such as, but not limited to, a component information unit, a component monitor, and/or an inventory unit (all described herein). The electronic computing device manipulates and transforms data represented as physical (electronic) quantities within the device's registers and memories into other data similarly represented as physical quantities within memories or registers or other such information storage, transmission, or display devices.

Overview of Discussion

Discussion below is divided into multiple sections. Section 1 describes a component information unit and its environment of use, a component monitor and an environment for its use, and a method of using the component information unit for tracking the location of a construction equipment component. Section 2 describes an inventory unit for construction equipment components, a system for tracking the location of a construction equipment component, a method of using the system for tracking the location of a construction equipment component, and a data mule for transporting information and/or bridging communications to assist in tracking the location of a construction equipment component.

Section 1

Component Information Unit

Figure 1:
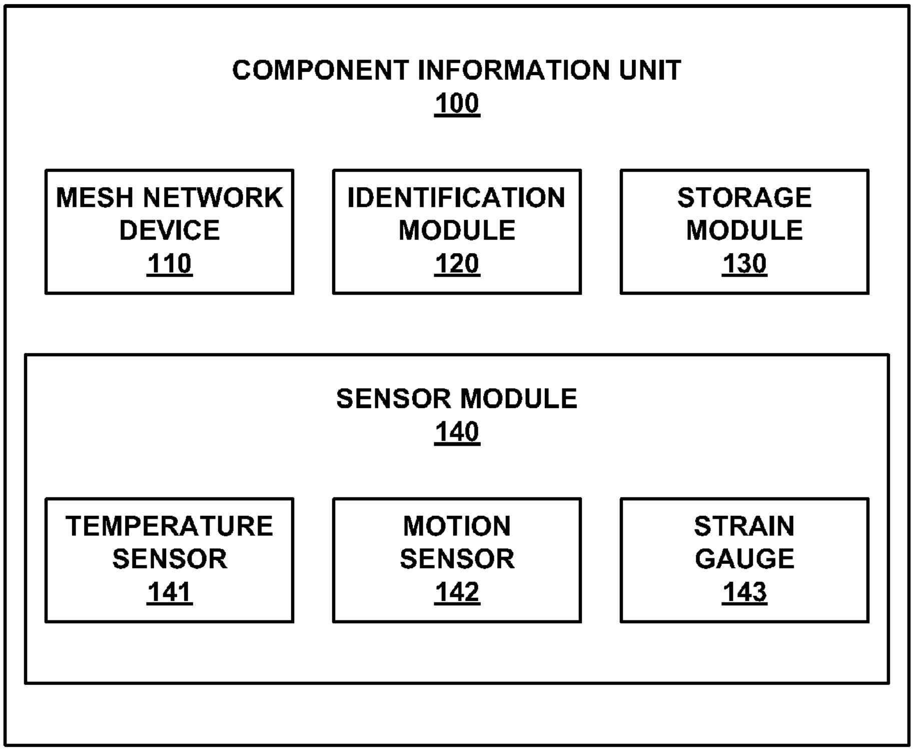
FIG. 1 is a block diagram of an example component information unit, in accordance with an embodiment.

FIG. 1 is a block diagram of an example component information unit 100, in accordance with an embodiment. Component information unit 100 is configured for mechanically coupling with a construction equipment component. Component information unit 100 operates to identify a component with which it is coupled and to access and exchange information (both via wireless mesh network communications). In one embodiment, component information unit 100 accesses and/or exchanges information with one or more other component information units and/or with a component monitor (e.g., component monitor 300 of FIG. 3) via wireless mesh network communications. This wireless mesh network communication can be initiated on an ad hoc basis, when the opportunity presents itself, in response to one or more of a variety of triggers.

Some non-limiting examples of non-destructive mechanical coupling mechanisms which component information unit 100 can utilize for mechanical coupling to a construction equipment component include: hook and loop fasteners, adhesives, epoxies, adhesive tape, magnets, and plastic line ties. In some embodiments, particularly where structural integrity of the construction equipment component is not an issue, other mechanisms of mechanical coupling which can be utilized can include bolts, screws, rivets, welds and other well known mechanisms for mechanical coupling.

By construction equipment component or simply "component," what is meant is a generally large component part of an item of construction equipment which may be separated from and/or stored separately from the item of construction equipment with which the component is utilized. Some non-limiting examples of construction equipment components with which component information unit 100 can be coupled and utilized include: components, sections and structural members (whether unique or modular) of a crane boom, crane jib (e.g., load jib), crane counterweight jib, crane tower, gantry, crane trolley, craned cat head, crane boom tip or the like; blades, buckets, implements, and/or attachments for dozers, graders, trucks, tractors, backhoes, cranes, loaders, forklifts, and the like; and trailers for trucks. In some embodiments, a construction equipment component can also comprise an entire item of small high value construction equipment, such as a generator, air pump, trencher, flood light, hydraulic lift, power tool (e.g., concrete saw), or the like.

As shown in FIG. 1, in one embodiment, component information unit 100 comprises a mesh network device 110, an identification module 120, a storage module 130, and a sensor module 140 (which may comprise or be coupled with one or more sensors). Mesh network device 110, identification module 120, storage module 130, and a sensor module are communicatively coupled, such as via a bus, to facilitate the exchange of information and instructions. In one embodiment, component information unit 100 is configured with a form factor that is very small relative to a component with which it is intended to be coupled. As a non-limiting example, in one embodiment, the form factor is approximately 2 inches by one inch by one half inch thick. Such a small relative form factor allows for component information unit 100 to be easily coupled with a construction equipment component in a fashion which does not impact the operation or use of the component.

For ease of explanation, certain constituent functions/components of component information unit 100 have been separated as shown in FIG. 1. However, it is appreciated that these may be combined and that additional functions/components may be included in some embodiments. Furthermore, in order to support clarity of explanation several common and well known components and circuits, such as a processor and a power source, are not shown or described extensively herein. This should not be taken to imply that such components are not included. For example component information unit 100 can include an independent processor or utilize a processor that is part of a sub-assembly such as mesh network device 110. As a multitude of construction equipment components possess no independent power source, the power source of component information unit 100 is often an internal battery or other power storage device, however, in some embodiments, a coupling with an external DC power source, such as a battery, solar panel, or DC or AC power source may be used to supply power for component information unit 100.

Mesh network device 110 operates to communicate with other mesh network devices via wireless mesh networks, such as ad hoc wireless mesh networks. Mesh network device 110 performs such wireless communication to access and/or exchange information. By accessing what is meant is that mesh network device 110 receives and/or retrieves information from an entity outside of component information unit 100. By exchanging what is meant is that mesh network device supplies, allows access to, or transmits information to an entity outside of component information unit 100. For example, in one embodiment, mesh network device 110 performs communication to access location information regarding a component with which component information unit 100 is coupled. This location information can be accessed for a variety of reasons, such as: component information unit 100 receiving a roll call signal or other signal which triggers information access; in response to a movement of the component with which component information unit 100 is coupled; in response to a cessation of movement of the component with which component information unit 100 is coupled; and/or in response to a sensor of sensor module 140 exceeding a preset threshold value.

In one embodiment, mesh network device 110 performs a wireless mesh network communication with an external device (e.g., component monitor 300 of FIG. 3) to access the location from a Global Navigation Satellite System (GNSS) receiver that is coupled with or part of the external device. As described herein, the external device which is accessed is typically close to or participating in an inventory movement of a component with which component information unit 100 is coupled. Thus, accessing this location information provides a relative location (e.g. within 100 feet) of component information unit 100 and thereby the component with which component information unit 100 is mechanically coupled.

It is appreciated that other information, such as location information of other components (and their identification) can be accessed as well. It is also appreciated that mesh network device 110 can exchange/provide a variety of information (such as its identity and location and/or previous location(s)) to entities outside of component information unit 100. Such accessed and exchanged information can, for example, comprise: information stored in storage module 130; information stored in identification module 120; information accessed from a component monitor; and/or information accessed/routed from another component information unit. Such information can be exchanged with other component information units and/or component monitors, such as component monitor 300 of FIG. 3.

In one embodiment, mesh network device 110 is or includes a radio frequency transceiver. In various embodiments, mesh network device 110 is configured as, or operates as, an endpoint of a wireless mesh network or a router which can route data from other devices on a wireless mesh network. Mesh network device 110 is a wireless transceiver which operates at short range (e.g., approximately 100 meters or less); at low power settings (such as, for example, approximately 25 mW); at low data rate (e.g., 250 Kbps); and often on an ad hoc basis in response to a triggering event such as sensing of motion, sensing of cessation of motion, elapse of a specified time period (e.g., 10 minutes, 2 hours, a day, etc.), entering communication range of another mesh network device (e.g., sensing the presence of another wireless mesh networking device or a wireless mesh network), and/or in response to a communicatively coupled sensor exceeding a preset threshold value. In one embodiment, mesh network device is configured to spend most of its time in a powered down state to conserve energy, and only wakes up into a powered up state on an ad hoc basis in response to a triggering event as described above.

Mesh network device 110, in various embodiments, operates on one or more frequency ranges which among others can include: the industrial, scientific and medical (ISM) radio bands; 868 MHz; 915 MHz; and 2.4 GHz. It is appreciated that in some embodiments, mesh network device 110 includes a microprocessor or microcontroller and memory (e.g., random access memory and/or read only memory). Mesh network device 110 initiates or operates on a mesh networking protocol which allows mesh networking nodes (such as component information unit 100) to enter and leave a local wireless mesh network at any time. This is called a self-forming, self-organizing, and/or self-healing network. Some examples of a mesh network device which may be utilized to perform some or all of the functions of mesh network device 110 include mesh network devices that are compliant with the ZigBee® specification and mesh network devices that are compliant with the Institute of Electrical and Electronics Engineers (IEEE) 802.15.4 standard for wireless personal area networks (WPANs).

Identification module 120 includes an identifier such as a number or alphanumeric which is used to identify component information unit 100 and thus the component with which component information unit 100 is coupled. This identifier can be assigned by a user or can be pre-configured within identification module 120. For example, in one embodiment the identifier is associated such as by a manufacturer, rental yard operator, standards organization, or other entity, with a particular component (such as in an inventory of components). This identifier can serve as an identification of the component or class/type of a component, such as for inventory, location tracking, and/or other purposes.

Identification module 120 operates, in association with the communicating performed by mesh network device 110, to identify a component with which component information unit 100 is coupled. Thus, in one embodiment, identification module 120 supplies the identifier for transmission in conjunction with some or all communications performed by mesh network device 110. In one embodiment, identification module 120 supplies the identifier for transmission to an outside entity in response to a roll call or some other signal received from an outside entity. It is appreciated that, in some embodiments, identification module 120 may comprise an identifier in a storage location which is part of mesh network device 110, such as a portion of a random access memory or a read only memory of mesh network device 110.

Storage module 130 stores information regarding a component with which component information unit 100 is coupled. This information can comprise storage of location information regarding the component, including historical records of location information regarding the component. This information can also comprise storage of information collected by one or more sensors, such as sensors of sensor module 140. In some embodiments, storage module 130 also stores information received, via wireless mesh network communication, from other entities such as component monitors (e.g., component monitor 300 of FIG. 3) or component information units coupled with other components. In one embodiment, storage module 130 stores locations of a variety of components in conjunction with their identities (and in some embodiments a timestamp), after receipt of such information from other entities, such as component information units coupled with other components. Additional information received regarding other components can also be stored. It is appreciated that, in some embodiments, storage module 130 may partly or entirely comprise a storage mechanism which is included in mesh network device 110, such as a random access memory of mesh network device 110.

Sensor module 140 comprises at least one sensor for sensing information, such as environmental information, related to a component with which component information unit 100 is coupled. This can include sensing information such as temperature, motion, cessation of motion, strain (or the like), among other information. Sensed information can be stored, such as in storage module 130, or transmitted in a communication to another entity via mesh network device 110.

In some embodiments, sensor module 140 also comprises circuitry, logic, and/or processing capability and computer-readable instructions for interpreting sensed information, such as whether a sensed input violates a threshold or range which is maintained in sensor module 140 (or elsewhere in component information unit 100). When such a violation is determined to have occurred, a preset action is triggered. For example, in one embodiment, a record of the violation is stored, such as in storage module 130. In another embodiment, a message is generated and supplied to mesh network device 110 for transmission to an entity external to component information unit 100, such that the external entity is made aware of the violation which has been sensed. In the case of a violated time-fence or geo-fence such a message can be used as a notification that a component is being stolen, used at a location which is not authorized (such as in a rental contract), and/or used at a time that is not authorized (such as in a rental contract).

In one embodiment sensor module 140 includes a temperature sensor 141. Temperature sensor 141 senses a temperature of a component (or its environment) with which component information unit 100 is coupled. This can comprise a temperature sensed during operation, storage, or transportation of a component, or a temperature sensed in response to a signal (such as a roll call signal) received from an outside entity by component information unit 100. Thermistors and resistance temperature sensors are some examples of sensors which can be utilized as temperature sensor 141. However, other well known mechanisms for sensing temperature can be employed as temperature sensor 141. In one embodiment, sensor module 140 determines whether a measurement from temperature sensor 141 violates a preset threshold or range.

In one embodiment sensor module 140 includes a motion sensor 142. Motion sensor 142 senses movement or a cessation of movement of a component with which component information unit 100 is coupled. Roll ball switches, tilt switches, vibration switches, centrifugal switches, optical roll ball switches, mercury switches, accelerometers, and strain gauges are some examples of sensors which can be utilized as motion sensor 142. However, other well known mechanisms for sensing motion can be employed as motion sensor 142. In one embodiment, sensor module 140 determines whether a measurement from motion sensor 142 violates a preset threshold, preset range, preset time-fence, or preset geo-fence.

In one embodiment sensor module 140 includes a strain gauge 143. Strain gauge 143 senses strain, compression, stress or other mechanical flexing of a component with which component information unit 100 is coupled. Typically, this sensing is performed during operation of the component, but can also be performed in response to a trigger or at a time interval. For example, the sensing of strain gauge 143 can be performed in response to motion being sensed by motion sensor 142. The sensing of strain gauge 143 can be performed in response to a signal (such as a roll call signal) received from an outside entity by component information unit 100. It is appreciated that, in some embodiments, an epoxy or adhesive used to affix strain gauge 143 to a component also simultaneously mechanically couples component information unit 100 to the same component. In some embodiments, sensor module 140 includes a plurality of strain gauges 143. For example, each of a plurality of strain gauges 143 can be oriented and coupled with a component in a fashion to facilitate sensing a particular type of mechanical flexing experienced by the component. In one embodiment, sensor module 140 determines whether a measurement from strain gauge 143 violates a preset threshold, preset range, preset time-fence, or preset geo-fence.

Figure 2:
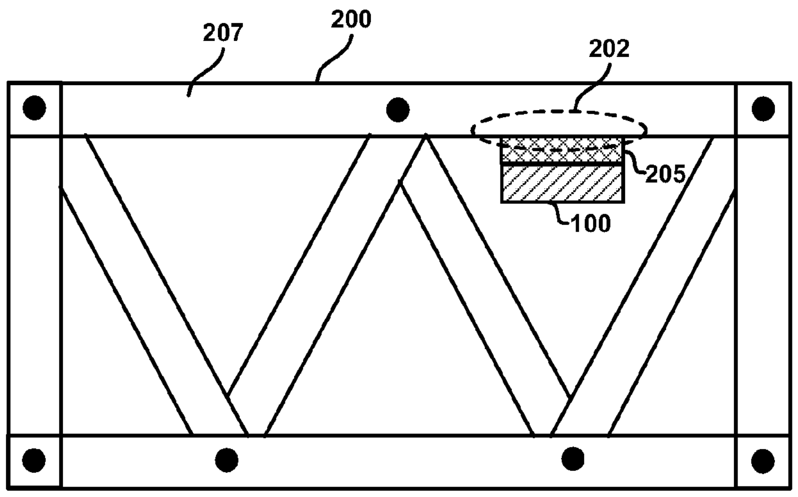
FIG. 2 shows a component information unit coupled with a construction equipment component, in accordance with an embodiment.

FIG. 2 shows a component information unit 100 coupled with an example construction equipment component 200, in accordance with an embodiment. As shown in FIG. 2, construction equipment component 200 is a crane component (e.g., a modular crane jib component) which is one of a plurality of crane components which together can be assembled into one or more configurations of the jib of a crane. Component 200 is shown as a crane component by way of example and not of limitation. Thus, it is appreciated that component 200 is not limited to being a crane component, and can instead be any of a variety of other construction equipment components, such as those previously described above. As shown in FIG. 2, a mechanical coupling 205 (e.g., an adhesive, epoxy, magnet, plastic line tie, hook and loop fastening, or other non-destructive mechanical coupling) is used to mechanically couple component information unit with component 200. In some embodiments, other mechanical coupling mechanisms such as bolts, screws, rivets, welds, and the like may be utilized for mechanical coupling 205.

Component information unit 100 is affixed to an attachment point, such as attachment point 202, on a component. As shown in FIG. 2, attachment point 202 can be on a structural member, such as structural member 207. In some embodiments, a component, such as component 200, is manufactured with a designated attachment point 202 marked or a preconfigured attachment point 202 (e.g., a tab, protected box, bracket, or mounting plate) for affixing component information unit 100 via mechanical coupling 205. The location and/or orientation for coupling component information unit 100 can be chosen or designated based on one or more of a variety of factors. Such factors include, but are not limited to: a location to sense a particular strain on a structural member of component 200; a location to sense movement; a location which minimizes disruption to handling of component 200; a location which minimizes disruption to operational use of component 200; and/or a location which will protect component information unit 100 from physical damage which could occur due to handling, transportation, or operation of component 200.

Component Monitor

Figure 3:
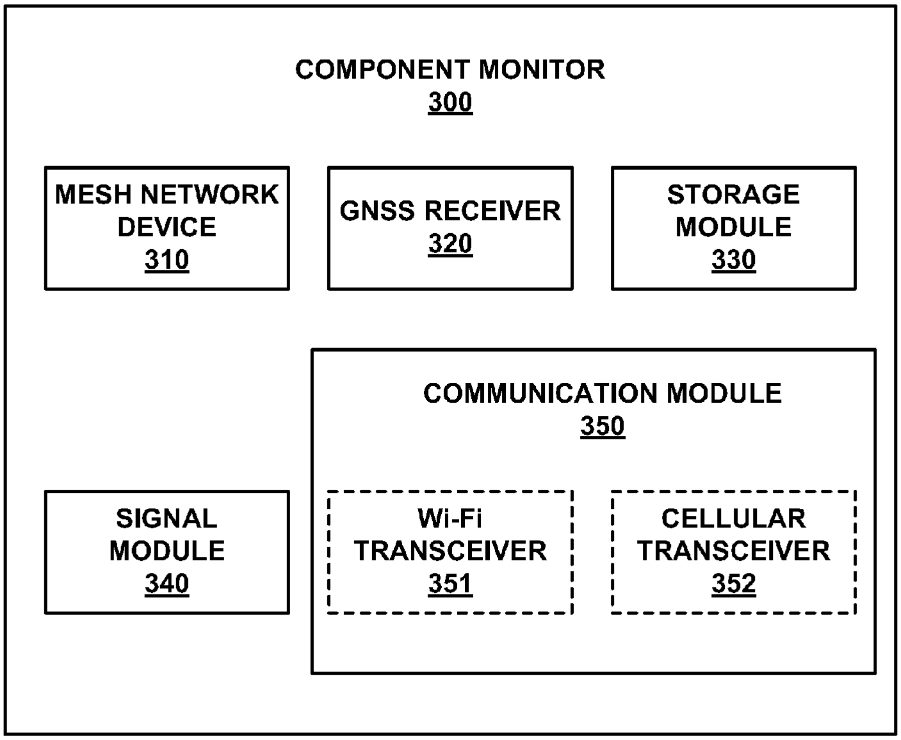
FIG. 3 is a block diagram of an example component monitor, in accordance with an embodiment.

FIG. 3 is a block diagram of an example component monitor 300, in accordance with an embodiment. As shown in FIG. 3, in one embodiment, component monitor 300 comprises a mesh network device 310, a GNSS receiver 320, a storage module 330, a signal module 340, and a communication module 350 (which may comprise or be coupled with one or more communication mechanisms). In one embodiment, component monitor 300 is configured as a hand held portable device. In another embodiment, component monitor 300 is coupled with an item of construction equipment or with a vehicle such as an inventory positioning vehicle which is utilized to transport or position construction equipment components such as component 200.

For ease of explanation, certain constituent functions/components of component monitor 300 have been separated as shown in FIG. 3, however, it is appreciated that these may be combined and that additional functions/components may be included in some embodiments. Furthermore, in order to support clarity of explanation several common and well known components and circuits, such as a processor and a power source, are not shown or described extensively herein. This should not be taken to imply that such components are not included. For example component monitor 300 can include an independent processor or utilize a processor that is part of a sub-assembly such as mesh network device 310. A power source may include an internal battery or other power storage device or a coupling to an external power source, such as a voltage supplied by a vehicle or item with which component monitor 300 is coupled.

Mesh network device 310 is a mesh networking device which communicates with one or more component information units, such as component information unit 100, via a wireless mesh network. In one embodiment, mesh network device 310 communicates via a wireless mesh network, which may be initiated on an ad hoc basis, to access an identity of a component with which component information unit 100 is coupled. Mesh network device 310 differs slightly from mesh network device 110 in that it may also operate as a bridge to other networks via an independent coupling or via a coupling to communication module 350. However, from a technical specification standpoint, mesh network device 310 is essentially the same as mesh network device 110. Thus, for purposes of brevity and clarity reference is made to previous description herein of mesh network device 110 for description of mesh network device 310. Some examples of the independent coupling and/or the coupling mechanism available via communication module 350 include couplings which are: Wi-Fi alliance compatible; WiMAX (Worldwide Interoperability for Microwave Access); compliant with the IEEE 802.11 family of standards; compliant with the IEEE 802.16 standards; or utilize cellular, two-way radio, or other wireless standards of communication. Additionally, in one embodiment, a wireline coupling to another network or device is available via communication module 350.

GNSS receiver 320 provides a location such as a latitude and longitude at a particular point in time. Consider an example, where component monitor 300 is in proximity to component 200 while component 200 is being transported, inventory positioned, or operated (e.g., component monitor 300 could be coupled with a forklift which is positioning component 200). In such an example, the location provided by GNSS receiver 320 is a relative positional location (typically within ten feet of the actual location) of a component. This relative positional location can be provided to a component information unit 100, accessed by a component information unit 100, or can be stored in storage module 330. The positional location may be relative in that GNSS receiver 320 may be located proximate to the component, when the location is noted and associated with the component. Some examples of proximal locations include: on an inventory positioning vehicle, on a data mule, on a truck, on a trailer, on an item of construction equipment of which a component is an assembled part, and/or near an entry/exit to a storage area.

The operation of GNSS receivers, such as GNSS receiver 320, is well known. However in brief, GNSS receiver 320 is a navigation system that makes use of a constellation of satellites orbiting the earth which provide signals to a receiver (e.g., GNSS receiver 320) that estimates its position relative to the surface of the earth from those signals. Some examples of such satellite systems include the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU). It is appreciated that various enhancements to GNSS receiver 320 may be employed to increase the positional accuracy of its location determinations. Some examples of enhancements include the Wide Area Augmentation System (WAAS), differential GPS (DGPS) and the like; and Real Time Kinematics (RTK).

Storage module 330 stores a location of a component. In one embodiment, the location is stored in association with an identity of the component, wherein the identity is accessed from a component information unit 100 which is mechanically coupled with the component. In one embodiment, the location is also stored in association with a timestamp, such as a current time at the storage of the location of the component, or a timestamp received via communication with a component information unit 100. The stored location can be a location received from GNSS receiver 320 or a location accessed, such as from a storage module 130 of a component information unit 100. Storage module 330 can be implemented by well known methods, including solid state memory such as random access memory or mass storage such as a hard disk drive. It is appreciated that, in some embodiments, storage module 130 may partly or entirely comprise a storage mechanism which is included in mesh network device 310, such as a random access memory mesh network device 310.

Signal module 340, when utilized, provides one or more signals for transmission to and receipt by a component information unit 100. For example, in one embodiment, signal module 340 outputs a signal to indicate movement completion to component information unit 100, which is coupled with a component being moved. A movement completion signal can indicate that an inventory movement of the component has been completed. A movement completion signal can be sent automatically, such as upon a load sensor of an inventory positioning vehicle indicating that a load has been released. A movement completion signal can also be sent in response to an operator input action, such as an operator pushing a button after completion of an inventory movement of a component. It is appreciated that such a movement completion signal can be specifically addressed to a particular component, such as via the inclusion of an identifier associated with a particular component.

In one embodiment, signal module 340 is configured for signaling an information request to a component information unit 100. For example, the information request can request information regarding a component with which component information unit 100 is coupled. The requested information can comprise a request for an identification of the component, a request for stored location information regarding the component, or a request for other information which may be stored in component information unit 100. Such a request signal can comprise an individually addressed signal, a signal addressed to a class or group of components (e.g., all crane components) or a generically addressed signal which would be responded to by any component information unit 100 in receipt. One example of a generically addressed request signal is a roll call signal. In one embodiment, a roll call signal requests identity information from all component information units 100 in receipt of the roll call signal. It is appreciated that additional signals can be sent from signal module 340 in other embodiments, and that these signals may request or provide particular information, or request performance of a particular action.

Communication module 350 provides a bridge for linking component monitor 300 with another network or entity outside of any wireless mesh network in which component monitor 300 participates. In one embodiment, communication module 350 establishes communication with an inventory unit (e.g., inventory unit 900 shown in FIG. 9) to transfer some or all information regarding component location and identity from component monitor 300 to inventory unit 900. In one embodiment, inventory unit 900 maintains an inventory of component locations, identities, and/or other information received from or accessed from component monitor 300 via communication module 350 is incorporated in this inventory.

In one embodiment, communication module 350 comprises a wireless communication module which facilitates wireless communication with a network or entity, such as an inventory unit. Communication module 350 can incorporate one or more wireless transceivers such as, but not limited to a WiMAX compatible transceiver, a Wi-Fi compatible transceiver, an IEEE 802.11 compatible transceiver, an 802.16 compatible transceiver, a two-way radio transceiver, a cellular transceiver, or other wireless transceiver. By way of example and not of limitation, communication module 350 has been shown in FIG. 3 as including Wi-Fi transceiver 351 and cellular transceiver 352.

It is appreciated, that in one embodiment, communication module 350 or some other portion of component monitor 300, also includes a wireline communications capability, such as a serial data transceiver (e.g., a Universal Serial Bus or the like). In one embodiment, all or part of the functionality of communication module 350 may be incorporated into another portion of component monitor, such as mesh network device 310. In some embodiments, communication module 350 is used to bridge communication from mesh network to another network or entity. Actively bridging communications in this fashion facilitates real-time streaming of communication to and from the mesh network and another network or entity which is linked into the mesh network via the bridge.

Figure 4:
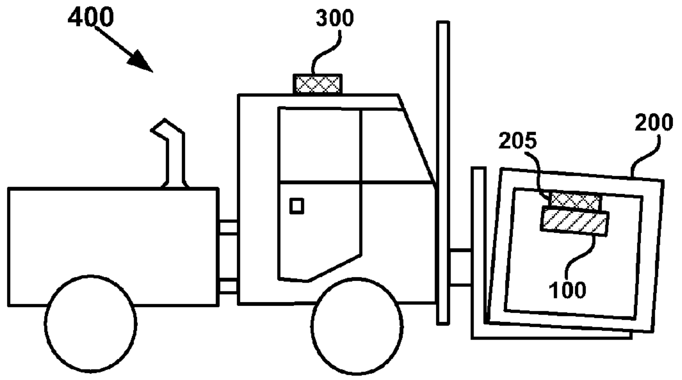
FIG. 4 shows a component monitor coupled with a forklift, in accordance with an embodiment.

FIG. 4 shows a component monitor 300 coupled with a forklift 400, in accordance with an embodiment. In one embodiment, forklift 400 is used as an inventory positioning vehicle which moves construction equipment components (e.g., component 200) from location to location in inventory movements in a component storage area. It is appreciated that forklift 400 can also move component 200 or other components in other scenarios, such as, for example, at a job site.

Figure 5:
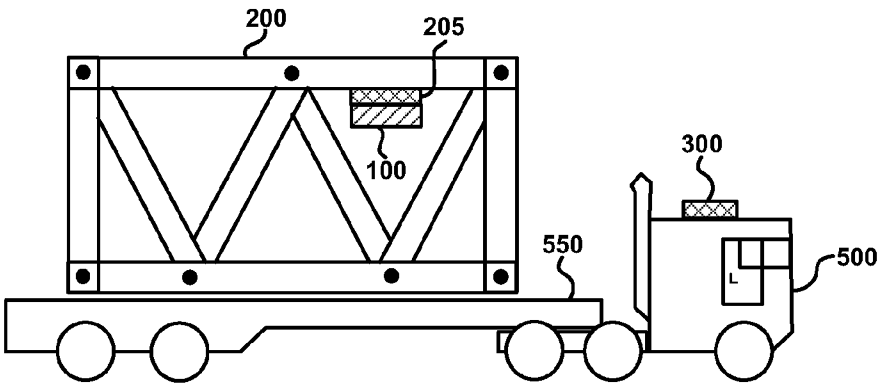
FIG. 5 shows a component monitor coupled with a truck, in accordance with an embodiment.

FIG. 5 shows a component monitor 300 coupled with a truck/tractor 500, in accordance with an embodiment. In one embodiment, truck 500 is used as an inventory positioning vehicle which moves construction equipment components (e.g., component 200) from location to location in inventory movements in a component storage area. It is appreciated that truck 500 can also move component 200 or other components in other scenarios, such as, for example: at a job site; between a storage area and a job site; between a manufacturer and a purchaser; and the like. In a configuration where truck 500 is configured with a separable trailer 550, a component monitor 300 can alternatively or additionally be coupled with trailer 550.

Figure 6:
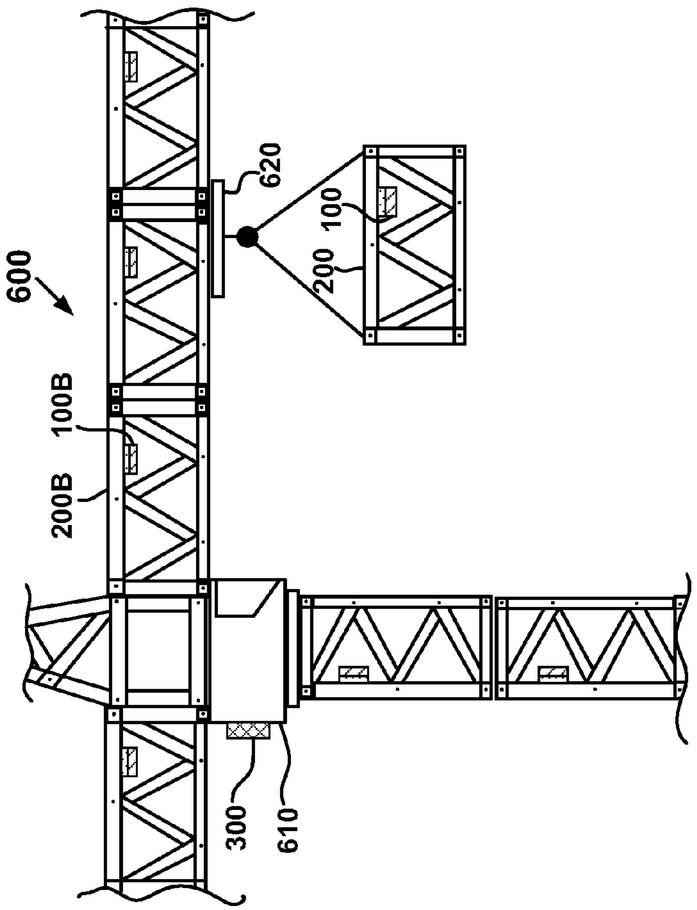
FIG. 6 shows a component monitor coupled with a crane, in accordance with an embodiment.

FIG. 6 shows a component monitor 300 coupled with a crane 600, in accordance with an embodiment. By way of example and not of limitation, crane 600 is shown as a tower crane. It is appreciated that crane 600 can be any type of crane, including, but not limited to: a wheel mounted crane, a truck mounted crane, a crawler mounted crane, a gantry crane, an overhead crane, a monorail carrier, a stiff legged derrick, a straddle crane, a crane with a fixed boom, a crane with a telescoping boom, and a crane with a hoist but no boom. As shown in FIG. 6, component monitor 300 is coupled with crane cab 610, but may be coupled with some other portion of crane 600. In one embodiment, crane 600 is used as an inventory positioning vehicle which moves construction equipment components (e.g., component 200) from location to location in inventory movements in a component storage area. It is appreciated that crane 600 can also move component 200 or other components in other scenarios, such as, for example, at a job site or a manufacturing site.

As illustrated by FIG. 6, crane 600 is comprised of modular components, such as crane component 200B. For purposes of example, component 200B is a modular component similar to component 200, which is shown suspended from trolley 620 of the load jib of crane 600. A component information unit 100B is mechanically coupled with crane component 200B. FIG. 6 provides one example illustrating that similar components (e.g., 200 and 200B) may exist in a storage area, in an assembled construction equipment item such as crane 600, on a job site, in a manufacturing facility, or at some other location or combination of construction equipment item and location.

Hand-Holdable Portable Component Monitor

Figure 7:
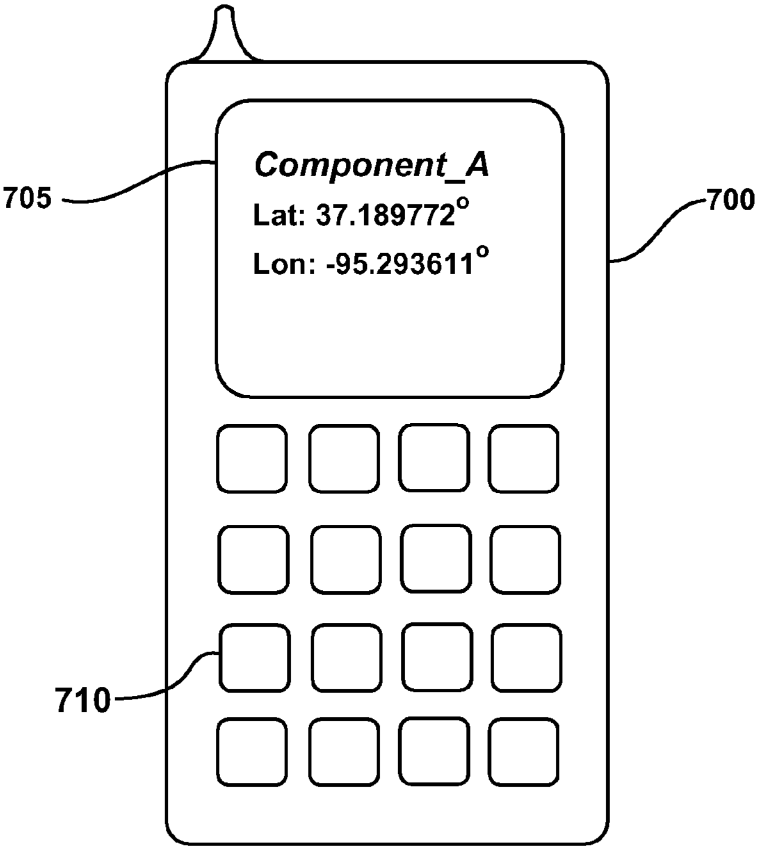
FIG. 7 shows an example of a component monitor configured within a hand-holdable portable device, in accordance with an embodiment.

FIG. 7 shows an example of a component monitor 300 configured within the form factor of a hand-holdable portable device 700, in accordance with an embodiment. It is appreciated that hand-holdable portable device 700 may be a standalone single purpose device, or that it may serve multiple purposes, such as also being a Personal Digital Assistant, hand held computer, cellular phone, or the like. In one embodiment hand-holdable portable device 700 is equipped with a display 705 for displaying a variety of information, such as information accessed from a component information unit 100 that is coupled with a construction equipment component. In some embodiments, hand-holdable portable device 700 also includes a user input 710 such as a keypad, keyboard, touchpad, touch screen, or other mechanism for user input and/or for selecting commands, functions, or signals produced or activated.

In one embodiment, hand-holdable portable device 700 is used by a job site worker, storage area worker, a transportation worker, an inspector (e.g., a crane component inspector), or other person or entity to access information from and/or provide information or instruction to a component information unit, such as component information unit 100. In one embodiment, hand-holdable portable device 700 is coupled (e.g., mechanically coupled or removably mechanically coupled) with a vehicle, such as an inventory positioning vehicle or other vehicle which is used to transport or position construction equipment components, such as component 200.

Figure 8:
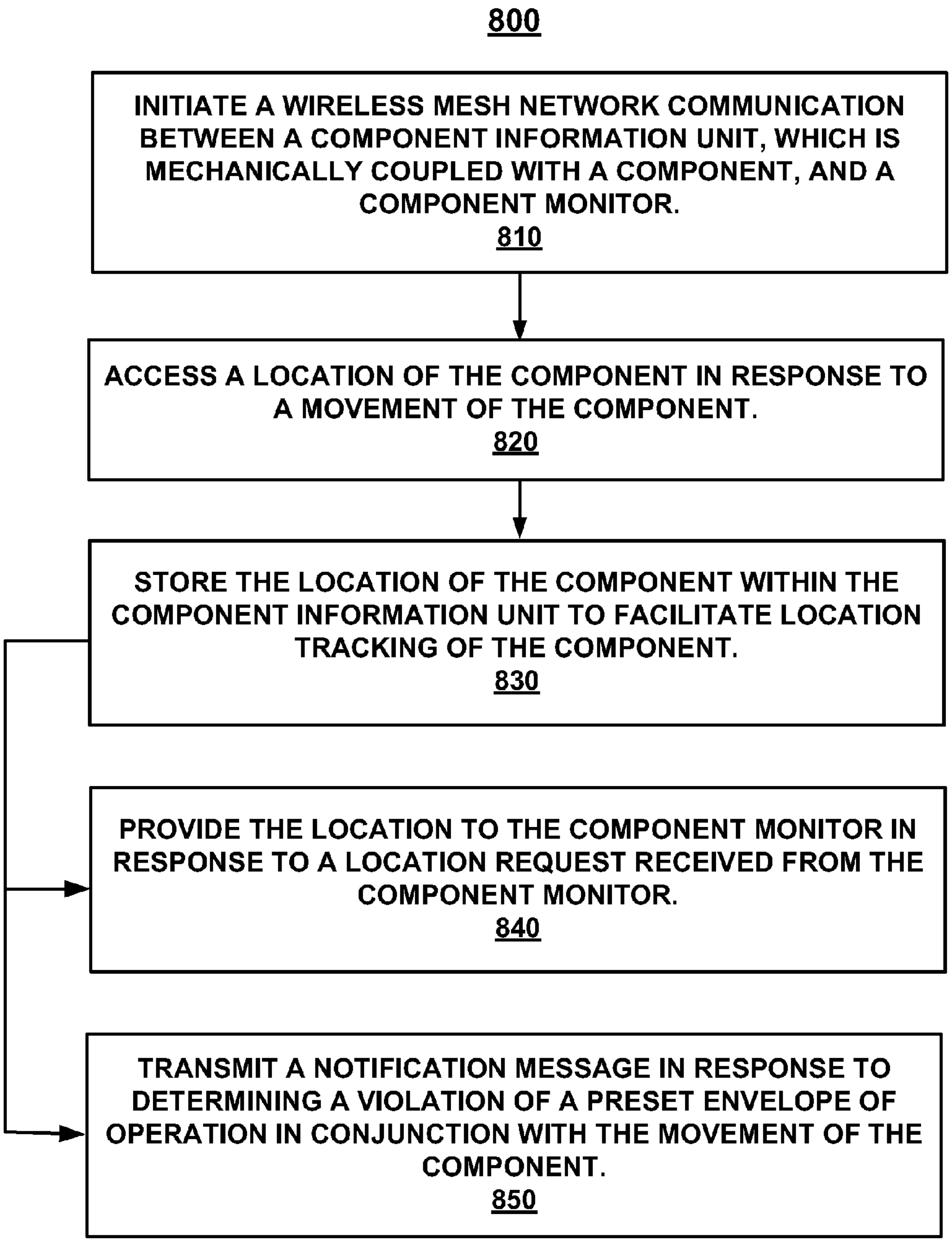
FIG. 8 is a flow diagram of an example method for construction equipment component location tracking, in accordance with an embodiment.

Example Method of Component Location Tracking With a Component Information Unit With reference to FIG. 8, flow diagram 800 illustrates example operations used by various embodiments. Flow diagram 800 includes processes and operations that, in various embodiments, are carried out by a processor under the control of computer-readable and computer-executable instructions. The computer-readable and computer-executable instructions reside, for example, in data storage features such as volatile memory, non-volatile memory, and/or storage module 130 (FIG. 1). The computer-readable and computer-executable instructions can also reside on computer readable media such as a hard disk drive, floppy disk, magnetic, tape, Compact Disc, Digital Versatile Disc, and the like. The computer-readable and computer-executable instructions, which may reside on computer readable media, are used to control or operate in conjunction with, for example, component information unit 100.

FIG. 8 is a flow diagram 800 of an example method for construction equipment component location tracking, in accordance with an embodiment. Reference will be made to FIGS. 1, 2, 3, and 4 to facilitate the explanation of the operations of the method of flow diagram 800. In one embodiment, the method of flow diagram 800 is performed using a component information unit 100 which is mechanically coupled with a component, such as component 200.

At operation 810, in one embodiment, a wireless mesh network communication is initiated between a component monitor and a component information unit which is mechanically coupled with the component being tracked. For example, in one embodiment, this comprises initiating a wireless mesh network communication between component information unit 100 and component monitor 300. The communication can be initiated either by component information unit 100 or by component monitor 300. For purposes of this example, component information unit 100 is coupled with component 200 as shown in FIG. 2. Also, for purposes of this example, component monitor 300 is coupled with an inventory positioning vehicle, such as forklift 400 as shown in FIG. 4.

In one embodiment, the wireless mesh network communication is initiated ad hoc, such as in response to one or more triggers or triggering events such as: sensing of movement of component 200 with motion sensor 142 of component information unit; and/or mesh network device 110 sensing radio frequency emanations from component monitor 300, thus indicating the presence of a wireless mesh networking device which is in range and with which ad hoc communications can be established. In one embodiment, a combination of triggers causes communication to be initiated. For example, when movement is sensed and presence of component monitor 300 is sensed, component information unit 100 initializes the wireless mesh network communication between component information unit 100 and component monitor 300.

In one embodiment, prior to wireless mesh network communication being initiated, component information unit 100 is in a low power or sleep mode which is used to conserve power (such as battery power). Component information unit 100 wakes up in response to one or more triggering events such as sensing of movement and/or sensing of another wireless mesh networking device within communication range.

In one embodiment, the component (e.g., component 200) with which component information unit 100 is coupled is identified to component monitor 300 during the wireless mesh network communication. This can be done by transmitting the identifier stored in identification module 120 or by allowing component monitor to retrieve the identifier from identification module 120. In one example, all outgoing communications from component information unit 100 include the identifier from identification module 120 as a portion (e.g., message header) of the communications.

At operation 820, in one embodiment, a location of the component is accessed in response to a movement of the component. This can comprise accessing the location upon cessation of a component movement and/or at a time while movement of the component is still taking place. Such a movement can comprise an inventory movement. In various embodiments what is meant by accessing is that component information unit 100 can request, receive, or retrieve this location (or information from which the location can be determined) from GNSS receiver 320 or some other entity external to component information unit 100. Following the above example, this can comprise accessing the location of component 200 as determined by GNSS receiver 320 of component monitor 300. Consider an embodiment, where GNSS receiver 320 reports a positional location of 37.189722° (latitude), −95.293611° (longitude) upon cessation of a component movement of component 200. In such an embodiment 37.189722°, −95.293611° becomes the location which is accessed and attributed as the location of component 200 at the time of cessation of movement of component 200.

In one embodiment, what is meant by "cessation of a component movement" is completion of an inventory movement of component 200. Thus in one embodiment, the location is accessed upon receiving a movement completion signal, at component information unit 100. Such a movement completion signal can be generated by signal module 340 and sent from component monitor 300 to component information unit 100 via a wireless mesh network communication. The movement completion signal indicates a completion of an inventory movement of component 200 and may be triggered in various ways, such as release of a load as measured by a load sensor of forklift 400 or by initiation of an operator of forklift 400 (e.g., by pushing a button when an inventory movement is complete).

In one embodiment, what is meant by "cessation of a component movement" is a failure to sense movement of component 200 or a sensing of no movement of component 200. Such conditions can occur at the completion of an inventory movement operation and can also occur in conjunction with other movements of component 200. In one embodiment, the location is accessed upon sensing a cessation of movement of component 200 as indicated by motion sensor 142. For example, if no motion or change in motion is sensed by motion sensor 142 for a particular period of time (e.g., 5 seconds, 15 seconds, 30 seconds), the location is accessed. In some embodiments, a combination of inputs is used to trigger accessing of the location of component 200. As an example, in one embodiment, the location of component 200 is accessed when both a cessation of movement is sensed and some type of inventory movement signal/inventory movement completion signal is received.

In one embodiment, a location or approximate location of component 200 can be accessed by accessing the location of a component which is near component 200. By near, what is meant is within direct wireless mesh network communication range of component information unit 100. As the direct communication range of the wireless mesh network device 110 is fairly localized, with respect to the size of a typical component storage area, accessing a location of another component with which direct communication can be established can provide an approximate location of component 200 (e.g., likely within 100 feet). While this location may not always be as precise as is desirable for some purposes, it serves to generally indicate that component 200 is/was at a particular location (e.g., a storage area) at a particular time (when a timestamp is used).

Consider the example above where the location of component 200 is 37.189722°, −95.293611°. In one embodiment, if this location is unable to be accessed, such as from component monitor 300, an approximate location is instead accessed via direct mesh network communication with a nearby component's component information unit. For purposes of this example, a nearby component within direct mesh network communication range (e.g., no hops or intermediate mesh network nodes) has a most recently stored location of 37.189725°, −95.293618° stored in its storage module. In this example, the location of 37.189725°, −95.293618° is accessed upon cessation of movement of component 200. This location is not as accurate as 37.189722°, −95.293611°, but it provides a location which is with several feet (approximately within the maximum direct mesh network communication radius) of the actual location of component 200.

In an embodiment where several other components with communication information units are within direct mesh network communication range, the location of component 200 can be further estimated by interpolation (such as averaging) the locations received from several component information units, or choosing the location associated with a component information unit exhibiting the highest signal strength, highest signal to noise ratio, and/or quickest response time during a direct communication. In some embodiments, where the locations of several other components are accessed via direct mesh network communication, the location of component 200 is calculated. For example, through measurement of signal strength and/or propagation delay time in transmissions/responses mesh network device 110 can determine approximate distances to other components. A location of component 200 can then, in some embodiments, be triangulated from locations accessed from the other components.

In one embodiment, in addition to accessing a location at the completion of a movement, a location of a component 200 is also accessed by component information unit 100 at the beginning (initiation of a movement) and/or at periodic intervals during the movement. Additionally, in one embodiment, a timestamp is also accessed in conjunction with accessing of a location. The timestamp is typically a representation of the particular time at which the location is accessed.

At operation 830, in one embodiment, the location of the component is stored within the component information unit to facilitate location tracking of the component. In one embodiment, this comprises storing the accessed location within a storage of component information unit 100, such as storage module 130. In one embodiment, when the location is stored, it supplants or causes the erasure of a previously stored location. In one embodiment, when the location is stored, it becomes the most recently stored location in a list of stored locations. In one embodiment, a timestamp is associated with the accessed location and stored in association with the location. The timestamp can be accessed in a similar manner as the accessing of the location, or the timestamp can be generated locally such as by a clock (e.g., a clock of mesh network device 110). In one embodiment, the timestamp represents a date time group (DTG) comprising a date and time of day of that the location was accessed and/or stored.

The stored location within component information unit 100 facilitates location tracking of the component because it can be accessed, such as by component monitor 300, at a later time. Consider an example where component monitor 300 sends a roll call signal or a location request signal out on a wireless mesh network of which component information unit 100 is a party. Component information unit 100, in one embodiment, responds by providing an identity and a location (e.g., a most recently stored location) of component 200. This allows an operator to quickly locate component 200, such as in a storage yard, even if component 200 is covered with weeds or obscured by other components. When a time series of locations is stored within component information unit 100, this information can be later accessed and serve as a location log for component 200.

At operation 840, in one embodiment, the location is provided to the component monitor. For example, in one embodiment, the location of component 200 is provided to component monitor 300. The location can be automatically provided, or provided in response to a location request received from component monitor 300. As described above such a request can take the form of a roll call signal, location request signal (e.g., a signal addressed to a class of components, an individual component, or to all components), or some other signal. Such signals are generated, in one embodiment, by signal module 340.

Consider an example, where an operator is driving forklift 400 through a storage area and is searching for component 200. In response to a request from the operator, component monitor 300 sends out a location request signal addressed to component 200 (e.g., addressed with an identifier associated with component 200). Component information unit 100 responds by sending an identifier and stored location to component monitor 300. Using this information, forklift 400 is driven directly to the location of component 200, thus reducing or eliminating time that would otherwise be spent searching for component 200.

At operation 850, in one embodiment, a notification message is transmitted in response to determining a violation of a preset envelope of operation in conjunction with the movement of the component. The notification message identifies the component and includes information regarding the type of envelope violated. The notification message and can also include other information, such as a location and/or timestamp associated with the envelope violation. This can comprise component information unit 100 transmitting a notification message to component monitor 300 (or other component monitor) or to another entity on a wireless mesh network when a violation of a preset threshold or range is determined by sensor module 140.

In one embodiment, the notification message indicates that motion has been sensed at a time which violates a preset time of operation envelope (e.g., a time-fence) stored within component information unit 100. A time-fence as described herein can comprise a stored range set of ranges of allowed or disallowed times and/or dates of operation related to the component. In one embodiment, the notification message indicates that motion has been sensed while component 200 is at a location which violates a preset location of operation envelope (e.g., a geo-fence) stored within component information unit 100. A geo-fence as described herein can comprise a stored set of geographic points which define an authorized or unauthorized area or areas of operation for a component. In one embodiment, the notification message indicates that mechanical flexing or strain has been sensed which violates an envelope of operation (e.g., a range of acceptable strain or a maximum allowed threshold of strain) stored within component information unit 100.

Operational envelopes associated with a notification message can be preset (e.g. stored with component information unit 100) to ensure safe operation of a component or to ensure operation on a component in a manner which is consistent with the manner for which the component was contracted for use (e.g., rented for use only on a Friday with a return date of Monday, and thus no use authorized on Saturday or Sunday). Such a notification can alert a system, entity, or person that a component is moved or used in a manner, location, or time period which is not expected, authorized, and/or allowed. In an environment such as a storage area or job site, this can comprise transmitting the notification message to a component monitor which is positioned at a gate or other entrance/egress point, such that the notification message is transmitted to the component monitor when the component is being stolen or moved in an unauthorized manner.

Section 2

Example Inventory Unit

Figure 9:
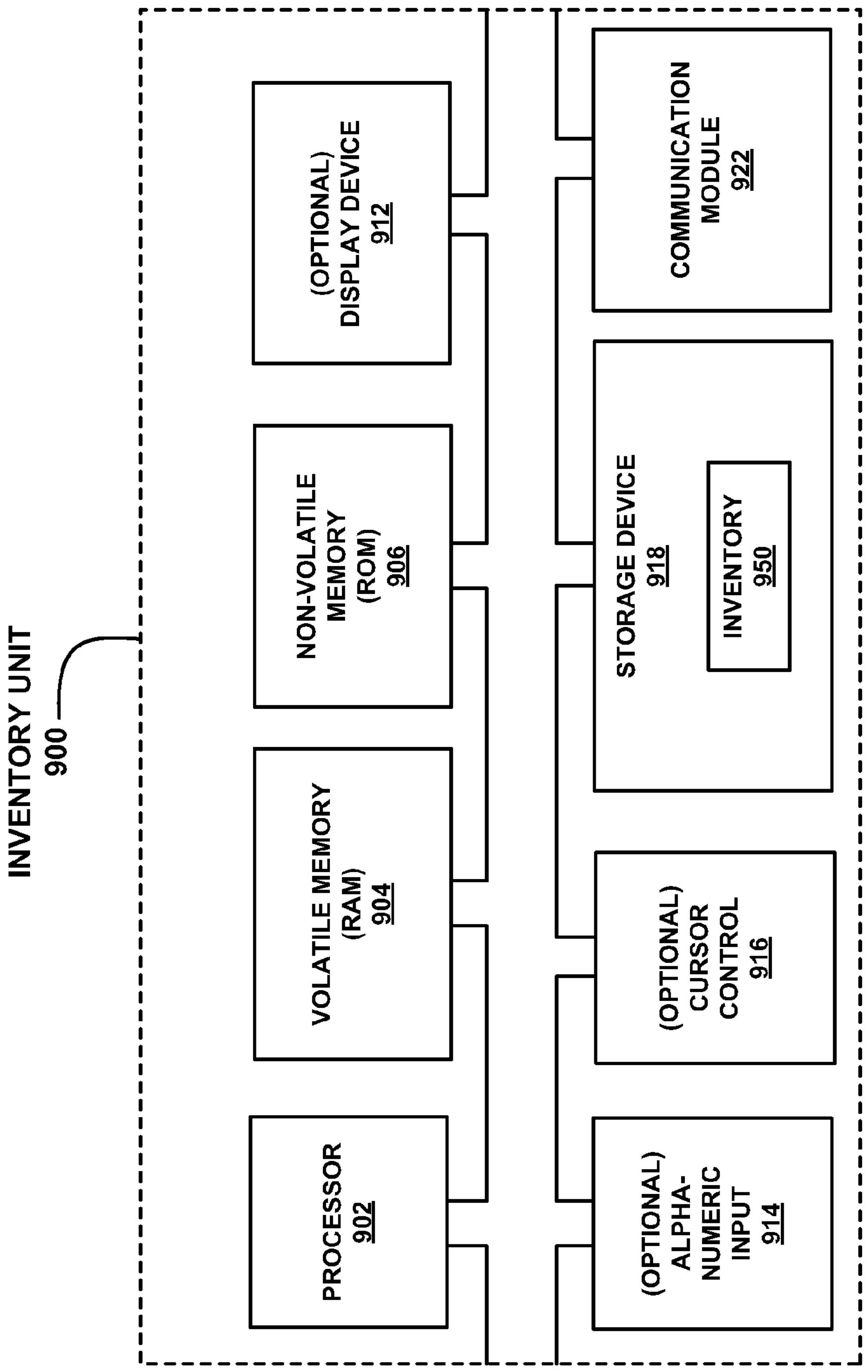
FIG. 9 is a block diagram of an example inventory unit, in accordance with an embodiment.

FIG. 9 is a block diagram of an example inventory unit 900, in accordance with an embodiment. Inventory unit 900 of FIG. 9 comprises an address/data bus 910 for communicating information, one or more processors 902 coupled with bus 910 for processing information and instructions. Processor unit(s) 902 may be a microprocessor or any other type of processor. Inventory unit 900 also includes data storage features such as a computer usable volatile memory 904 (e.g., random access memory, static RAM, dynamic RAM, etc.) coupled with bus 910 for storing information and instructions for processor(s) 902, a computer usable non-volatile memory 906 (e.g., read only memory, programmable ROM, flash memory, EPROM, EEPROM, etc.) coupled with bus 910 for storing static information and instructions for processor(s) 902.

An optional display device 912 may be coupled with bus 910 of inventory unit 900 for displaying video and/or graphics. It should be appreciated that optional display device 912 may be a cathode ray tube (CRT), flat panel liquid crystal display (LCD), field emission display (FED), plasma display or any other display device suitable for displaying video and/or graphic images and alphanumeric characters recognizable to a user.

In one embodiment, after inventory unit 900 accesses a location and identity of a component, such as component 200, display device 912 displays the location and identity associated with component 200. This location and identity can be displayed in numerous fashions. For example, in one embodiment, the location and identity of component 200 can be as text information, such as in a spreadsheet. Consider an embodiment where inventory unit 900 accesses an identifier "Component_A" and a location of 37.189722°, −95.293611° associated with component 200. In one such embodiment, inventory unit 900 displays identifier "Component_A" and location 37.189722°, −95.293611° on display device 912 in association with component 200. In other embodiments, some or all information accessed regarding a component, such as component 200 is displayed in a more intuitive graphic format, such as with graphic representations of a component overlaid upon the component's location with respect to a map of a storage area, job site, manufacturing site, or the like.

Optionally, inventory unit 900 may include an alphanumeric input device 914 including alphanumeric and function keys coupled with bus 910 for communicating information and command selections to the processor(s) 902. Inventory unit 900 can include an optional cursor control or cursor directing device 916 coupled with bus 910 for communicating user input information and command selections to the processor(s) 902. The cursor directing device 916 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 914 using special keys and key sequence commands. Embodiments herein are also well suited to directing a cursor by other means such as, for example, voice commands.

Inventory unit 900 of FIG. 9 may also include one or more optional computer usable data storage devices 918 such as a computer-readable magnetic or optical disk (e.g., hard disk, floppy diskette, Compact Disc-Read Only Memory (CD-ROM), Digital Versatile Disc (DVD)) and disk drive coupled with bus 910 for storing information and/or computer executable instructions. In one embodiment, one or more storage devices 918 are utilized to store an inventory 950 which includes locations and associated identities of one or more construction equipment components, such as component 200 of FIG. 2. It is appreciated that a timestamp and or other information can be stored in inventory 950 in association with an identity of a component. Thus storage of information is not limited to just location information, and in some embodiments, may not include location information.

Inventory unit 900 also includes one or more communication interfaces as part of communication module 922. For example, communication module 922 may include a communication interfaces such as, but not limited to, a serial port, parallel port, Universal Serial Bus (USB), Ethernet port, antenna, or other input/output interface. Communication module 922 may electrically, optically, or wirelessly (e.g. via radio frequency) couple a computer system, such as inventory unit 900 with another device, such as a cellular telephone, radio, component monitor 300, component information unit 100, or other computer system. In one embodiment, communication module 922 comprises complementary communications mechanisms to those of a component monitor 300 with which it communicates.

Example Display of Component Information

Figure 10:
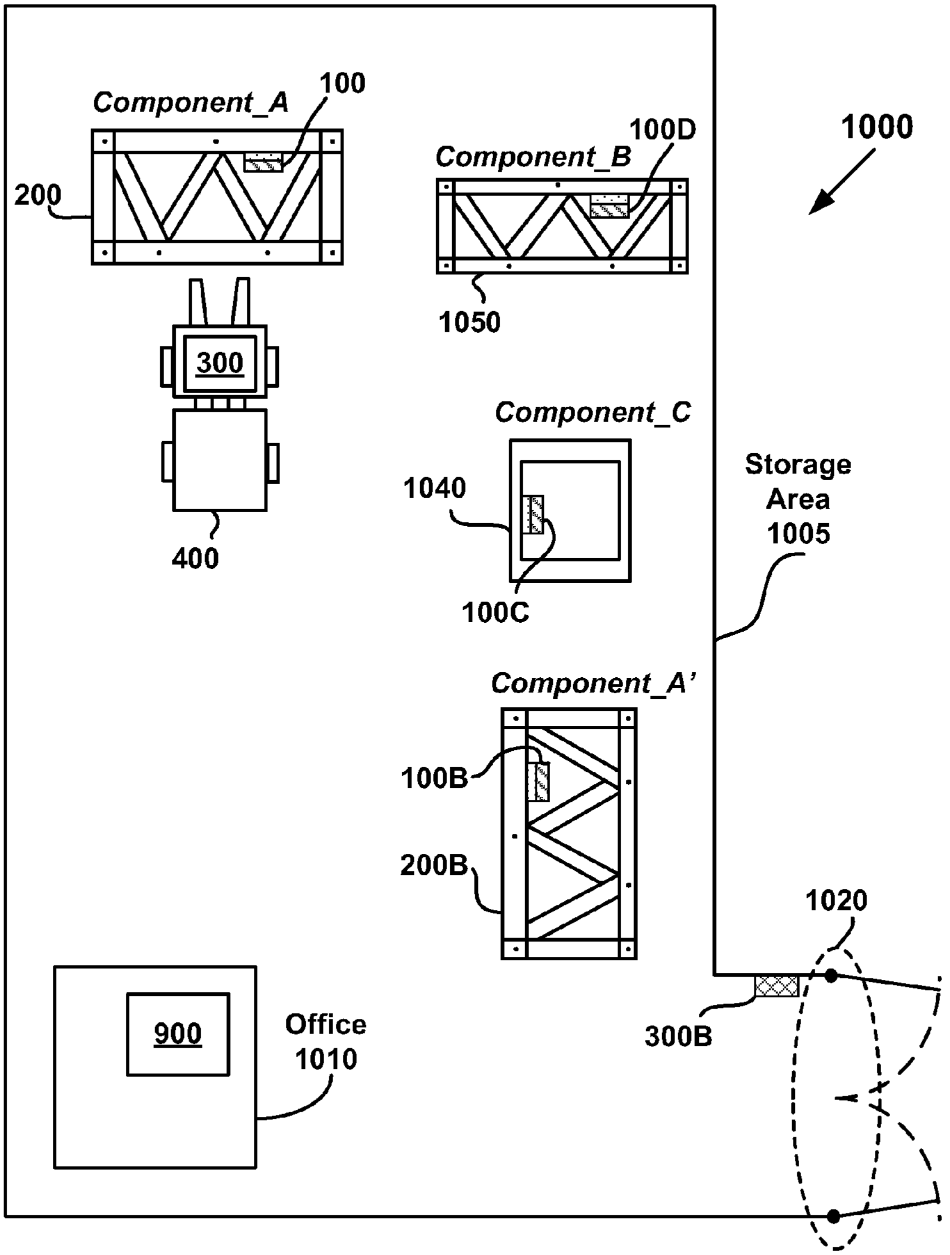
FIG. 10 shows a display of a component location and identity in relation to a map of a construction equipment component storage area, as displayed by an example inventory unit, in accordance with an embodiment.

FIG. 10 shows a display 1000 of a component location and identity in relation to a map of a construction equipment component storage area 1005, as displayed by inventory unit 900, in accordance with an embodiment. Display 1000 is one example of a display of inventory information from inventory 950, which can be displayed on display device 912 of inventory unit 900. It is appreciated that many variations are possible and anticipated, and that display 1000 is shown by way of example and not of limitation. In display 1000 locations and identities of components are shown in relation to a map/diagram of storage area 1005. The map like nature of display 1000 allows a user to intuitively visualize the location of a component within storage area 1005.

Display 1000 shows an office 1010 where inventory unit 900 resides. Forklift 400, which includes component monitor 300, is being used as an inventory positioning vehicle. Inventory unit 900 communicates with component monitor 300 via a wireless network (e.g., an 802.11 type network) which encompasses all or part of storage area 1005. A gate area 1020 serves as an entrance/exit to storage area 1005. A second component monitor 300B is positioned in gate area 1020 to facilitate wireless mesh network communications with component information units coupled with components which enter and exit storage area 1005.

Component 200 is shown mechanically coupled with component information unit 100. Consider an example where forklift 400 has just completed an inventory movement of component 200. Component monitor 300 has communicated with component information unit 100 via a wireless mesh network, to access an identity and/or location of component 200. Component monitor 300 has also communicated the location and identity of component 200 to inventory unit 900, via a separate wireless network. Inventory unit 900 utilizes this information to display the legend "Component_A" in the upper left corner of a map of storage area 1005 in association with a graphical representation of component 200 and its location with in storage area 1005.

As shown in FIG. 10, a variety of other components are stored in storage area 1005. Component 1040 is coupled with component information unit 100C. The location of component 1040 is shown by a graphical display of component 1040 in conjunction with the legend "Component_C" which has been derived from the identifier of component 1040. Component 1050 is coupled with component information unit 100D. The location of component 1050 is shown by a graphical display of component 1050 in conjunction with the legend "Component_B" which has been derived from the identifier of component 1050. Component 200B is coupled with component information unit 100B. The location of component 200B is shown by a graphical display of component 1050 in conjunction with the legend "Component_A'" which has been derived from the identifier of component 200B. For purposes of this example, component 200B is a modular component which is identical to component 200. As shown, unique identifiers allow for independent location and inventory tracking of components 200 and 200B even though they may outwardly appear to be identical to one another.

Example System for Construction Equipment Component Location Tracking

Figure 11:
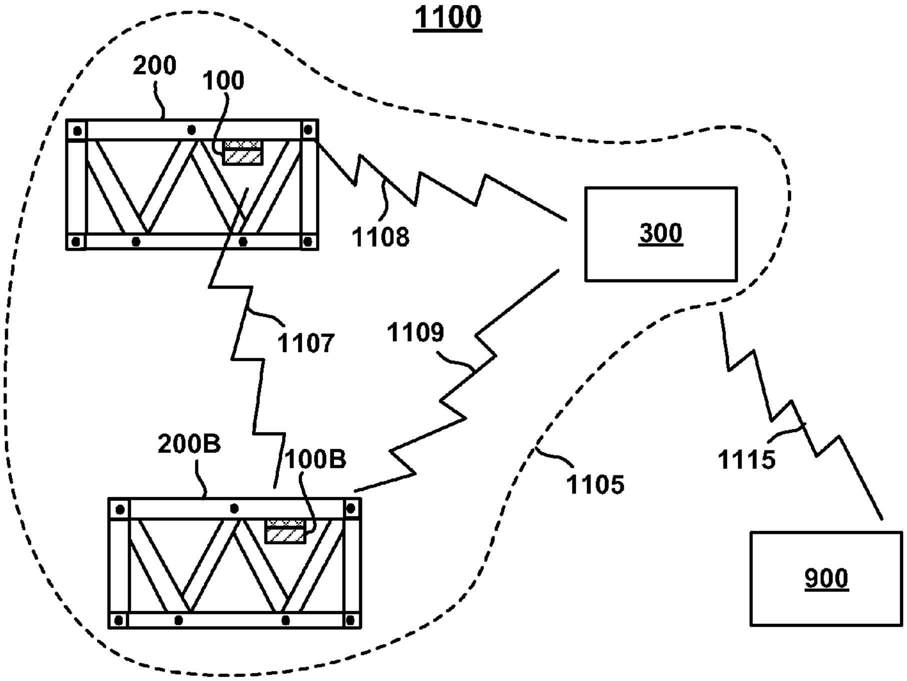
FIG. 11 is block diagram of a construction equipment component tracking system, in accordance with an embodiment.

FIG. 11 is block diagram of a construction equipment component tracking system 1100, in accordance with an embodiment. System 1100 is comprised of at least one component information unit 100, at least one component monitor 300, and an inventory unit 900. Another example of such a component tracking system is illustrated in display 1000 FIG. 10. Component information unit 100 is mechanically coupled with a component 200 and provides an identity of component 200 to component monitor 300 via a wireless mesh network communication between component information unit 100 and component monitor 300. A second component 200B is shown mechanically coupled with component information unit 100B.

Component monitor 300 is physically separate from the component with which component information unit 100 is coupled (e.g., not mechanically coupled with either component 200 or with component information unit 100). A wireless mesh network 1105 is comprised of one or more of wireless mesh network communication 1107 (between component 200 and component 200B), mesh network communication 1108 (between component 200 and component monitor 300), and mesh network communication 1109 (between component 200B and component monitor 300).

Component monitor 300 receives the identity (e.g., Component_A) of component 200, during a wireless mesh network communication with component information unit 100. Component monitor 300 also notes and stores a location of the component 200 at a completion of an inventory action involving the component. This noting and storing of the location of component 200 can be accomplished by accessing the location from component information unit 100 or via accessing and storing the location as indicated by GNSS receiver 320.

In some embodiments, component monitor 300 is physically coupled with an inventory positioning vehicle, such as, for example forklift 400 of FIG. 4. By physically coupled, what is meant is that component monitor is located on or within forklift 400, and in some embodiments is mechanically coupled with a portion of forklift 400. In some embodiments, component monitor 300 is coupled with a vehicle, such as, for example truck 500, which is used to transport construction equipment components between a component storage area and a job site. In one embodiment, as illustrated by display 1000 a component monitor (e.g., component monitor 300B) is positioned proximal to a gate or other access point of a component storage area. In other embodiments, component monitor 300 is coupled with a cab of a crane, such as crane cab 610 shown in FIG. 6. In one embodiment, as shown in FIG. 7, component monitor 300 is configured within a hand-holdable portable device, such as hand-holdable portable device 700.

Inventory unit 900 accesses the location and identity of a component (e.g., component 200) via a communication 1115 between inventory unit 900 and component monitor 300. In one embodiment, communication 1115 is a not a wireless mesh network communication, but is instead another form of wireless communication, several examples of which are described herein. Inventory unit 900 associates the location and identity of the component (e.g. component 200) with a timestamp in an inventory (e.g., inventory 950) of components. Inventory 950 can comprise a spreadsheet, database, or other form of inventory data structure which is maintained on storage device 918. In one embodiment inventory unit 900 includes or is coupled with a display device 912 for providing a display (e.g. display 1000) including the location and the identity of the component (e.g., component 200) and/or other components relative to a map of a component storage area or some other area such as a job site.

Figure 12:
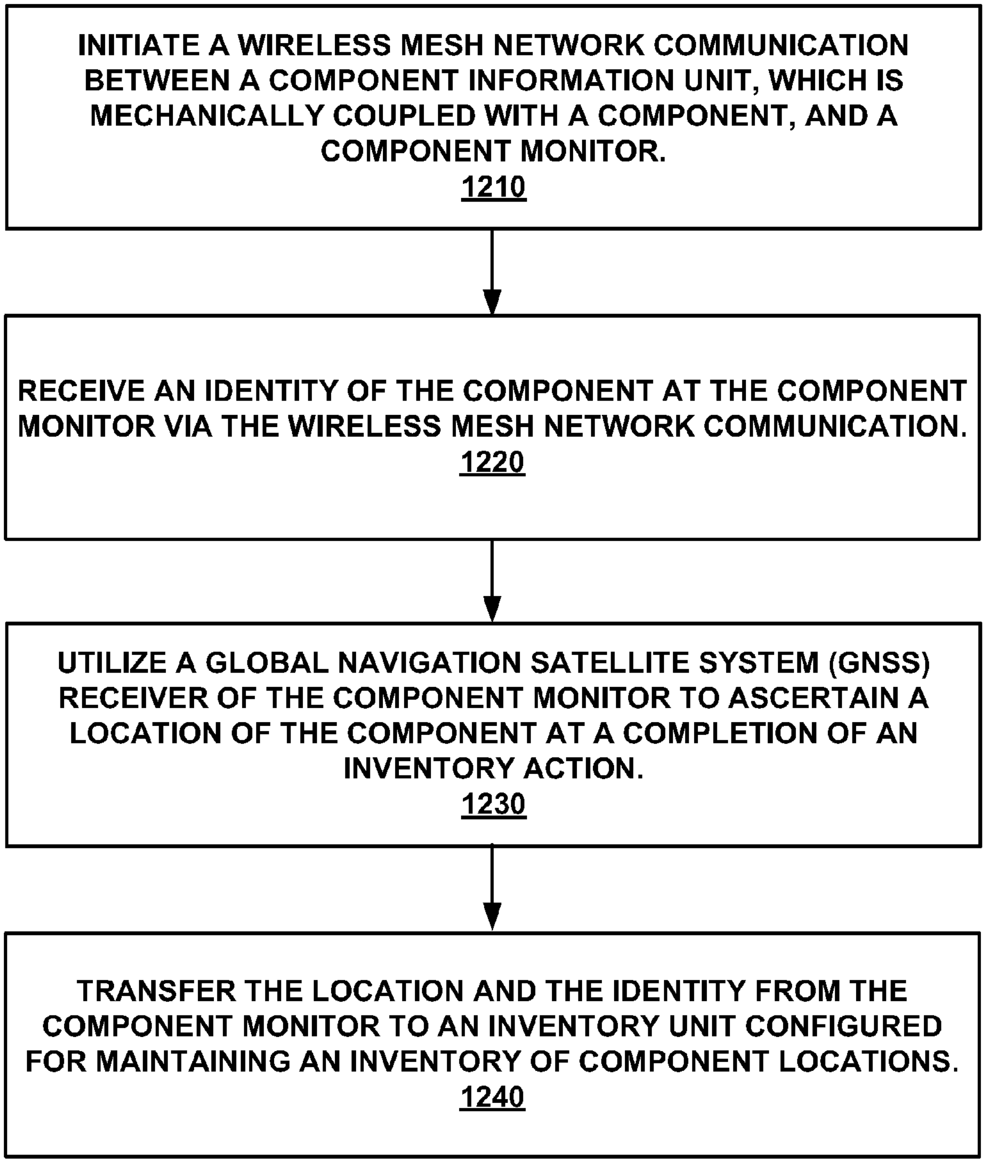
FIG. 12 is a flow diagram of an example method for construction equipment component tracking, in accordance with an embodiment.

Example Method of Component Location Tracking with a Component Tracking System With reference to FIG. 12, flow diagram 1200 illustrates example operations used by various embodiments. Flow diagram 1200 includes processes and operations that, in various embodiments, are carried out by a processor under the control of computer-readable and computer-executable instructions. The computer-readable and computer-executable instructions reside, for example, in data storage features such as volatile memory, non-volatile memory, and/or storage modules/devices associated with component information unit 100, component monitor 300, and/or inventory unit 900. The computer-readable and computer-executable instructions can also reside on computer readable media such as a hard disk drive, floppy disk, magnetic, tape, Compact Disc, Digital Versatile Disc, and the like. The computer-readable and computer-executable instructions, which may reside on computer readable media, are used to control or operate in conjunction with, for example, component information unit 100, component monitor 300, and/or inventory unit 900.

FIG. 12 is a flow diagram 1200 of an example method for construction equipment component location tracking, in accordance with an embodiment. Reference will be made to FIGS. 1, 2, 3, 4, 9, 10, and 11 to facilitate the explanation of the operations of the method of flow diagram 1200. By way of example, and not of limitation, the method of flow diagram 1200 will be described as being performed using all or some portion of component tracking system 1100, which is illustrated in FIG. 11.

At operation 1210, in one embodiment, a wireless mesh network communication is initiated between a component information unit and a component monitor. For example, while component information unit 100 is mechanically coupled with component 200, this communication can be initiated between component information unit 100 and component monitor 300. The instigator/initiator of the communication can be component information unit 100, component monitor 300, or a mesh network node coupled between component information unit 100 and component monitor 300 (e.g., component information unit 100B of mesh network 1105.

At operation 1220, in one embodiment, an identity of the component (e.g., component 200) is received at the component monitor via the wireless mesh network communication. For example, the identity "Component_A" of component 200 is received at component monitor 300 via wireless mesh network communication over wireless mesh network 1105.

At operation 1230, in one embodiment, Global Navigation Satellite System (GNSS) receiver 320 of component monitor 300 is utilized to ascertain a location of component 200 at a completion of an inventory action involving component 200. Consider an embodiment where the ascertained location is 37.189722°, −95.293611°. This location (37.189722°, −95.293611°) is then stored in storage module 330 in association with the identity of component 200.

At operation 1240, in one embodiment, the location and the identity of the component (e.g., component 200) are transferred from the component monitor to an inventory unit which maintains an inventory of component locations. For example, this can comprise transferring the location (37.189722°, −95.293611°) and the associated component identity (Component_A) from component monitor 300 to inventory unit 900 via wireless communication 1115. At inventory unit 900, in one embodiment, a timestamp such as date time group (e.g., 2008_07_19_1359) is associated with the location (37.189722°, −95.293611°) and with the identity (Component_A) in inventory 950 inventory. It is appreciated that a chronological list of locations and/or other information related to a component (or plurality of components) can be maintained in inventory 950. In one embodiment, the location and the identity of component 200 are displayed on a display device 912 coupled with inventory unit 900. As described herein, such a display can take many forms. For example, in one embodiment, the location and identity of component 200 can be displayed, such as in display 1000, relative to a map of a component storage area or other location.

Example Data Mule

In one embodiment, component monitor 300 is coupled with (e.g. located on or within or mechanically coupled by a mechanically coupling means described herein or other similar means) an inventory positioning vehicle (e.g., forklift 400, truck 500, trailer 550, crane 600, or other inventory positioning vehicle such as a loader) to create a data mule. Component monitor 300 of the data mule communicates with component information unit 100 and transfers or accesses information regarding a component, such an identity and/or location of component 200. The combination of component monitor 300 and forklift 400, as shown in FIG. 10, constitutes one embodiment of a data mule. Consider an example illustrated by FIG. 10, where component monitor 300 is in communication with component information unit 100. Information regarding component 200 can be accessed and/or transferred to component monitor 300. Additionally, information regarding other components (which is stored in component information unit 100) can also be accessed and/or transferred to component monitor 300.

The data mule is typically used in large areas, such as component storage areas like storage area 1005, to provide a means for moving/bridging component information (e.g., identity and location) to another network or device. Among other environments, a data mule can be useful in an environment where, for example, an 802.11 type wireless network does not provide coverage to an entire storage area. When an inventory positioning vehicle (400, 500, 600, or the like) performs an inventory movement of component 200, component monitor 300 communicates a wireless mesh network with component information unit 100. Upon completion of the inventory movement, component monitor 300 stores the inventory location and identity of component 200. This inventory location and identity are stored in component monitor 300 at least until communication module 350 is able to establish a bridge communication to another network or device and transfer the location and the identity to inventory unit 900.

In some embodiments, such communication with inventory unit 900 or a communication network (e.g., a local area network, wide area network, or the internet) may be immediate or on demand, such that the location and identity can essentially be streamed out on the network or to inventory unit 900 as they are accessed/noted. In other embodiments, component monitor 300 associated with the inventory positioning vehicle (400, 500, 600, or the like) being used as a data mule may need to store the information until a future time at which it enters communication range of inventory unit 900 or a communications network, at which point the location and identity information are then provided to or accessed by inventory unit 900. It is appreciated that other information regarding component 200 may also be accessed by inventory unit 900 via component monitor 300 in a similar manner.

In another embodiment, a data mule works in a reverse fashion from the above description to bridge a communication from inventory unit 900 or a communication network to one or more component information units (e.g., component information unit 100). This may require that the inventory positioning vehicle (400, 500, 600) be driven into mesh network communication range with a component information unit 100, before a communication can be bridged to component information unit 100.

It is appreciated that, in a similar manner, a component monitor 300 configured within a hand-holdable portable device 700 can be used in data mule like fashion by transporting it from place to place to access information from a component information unit 100 and bridge information to and from component information unit 100 and other communication networks and/or inventory unit 900.

Embodiments of the subject matter are thus described. While the subject matter has been described in particular embodiments, it should be appreciated that the subject matter should not be construed as limited by such embodiments, but rather construed according to the following claims.

What is claimed is:

1. A method for construction equipment component location tracking, said method comprising:

initiating a wireless mesh network communication between a component monitor and a component information unit mechanically coupled with the component;

accessing a location of said component as determined by a GNSS receiver of said component monitor in response to a movement of said component detected by a movement sensor of said component information unit;

storing said location of said component within said component information unit, said location received from said component monitor;

providing said location to said component monitor in response to a location request received from said component monitor to facilitate location tracking of said component; and transmitting a notification message from said component information unit to said component monitor in response to determining a violation of a preset envelop of operation in conjunction with said movement of said component, wherein said transmitting said notification message is in response to determining a violation of a preset geo-fence associated with said component.

2. The method for construction equipment component location tracking as recited in claim 1, wherein said transmitting the notification message in response to determining the violation of the preset envelope of operation in conjunction with said movement of said component comprises: transmitting said notification message in response to determining a violation of a preset time-fence associated with said component.

3. The method for construction equipment component location tracking as recited in claim 1, wherein said initiating the wireless mesh network communication between the component monitor and the component information unit mechanically coupled with said component comprises: initiating said wireless mesh network communication on an ad hoc basis in response to sensing said movement of said component with a motion sensor of said component information unit.

4. The method for construction equipment component location tracking as recited in claim 1 wherein said initiating the wireless mesh network communication between the component monitor and the component information unit mechanically coupled with said component comprises: identifying said component to said component monitor during said wireless mesh network communication.

5. The method for construction equipment component location tracking as recited in claim 1, wherein said accessing the location of said component in response to the movement of said component comprises: accessing said location upon receiving a movement completion signal at said component information unit from said component monitor via said wireless mesh network, said movement completion signal indicating completion of an inventory movement of said component.

6. The method for construction equipment component location tracking as recited in claim 1, wherein said accessing the location of said component in response to the movement of said component comprises: accessing said location upon sensing a cessation of movement of said component as indicated by a motion sensor of said component information unit.

7. The method for construction equipment component location tracking as recited in claim 1, wherein said storing said location of said component within said component information unit to facilitate location tracking of said component comprises: storing said location in association with a timestamp.

8. A component information unit configured for mechanically coupling with a construction equipment component, said component information unit comprising:

a movement sensor;

a mesh network device configured for communicating via a wireless mesh network with a component monitor to access location information regarding said component in response to a movement of said component detected by said movement sensor, and transmitting a notification message to said component monitor in response to determining a violation of a preset envelop of operation in conjunction with said movement of said component, wherein said location information comprises a location accessed from a Global Navigation Satellite System (GNSS) receiver of said component monitor;

an identification module configured for identifying said component in association with said communicating; and a storage module configured for storing said location information transmitted by said component monitor regarding said component;

wherein said location information is provided to said component monitor in response to a location request received from said component monitor to facilitate location tracking of said component; and wherein said transmitting said notification message is in response to determining a violation of a preset geo-fence associated with said component.

9. The component information unit of claim 8, wherein said component information unit further comprises:

a sensor module comprising at least one sensor for sensing environmental information related to said component.

10. The component information unit of claim 9, wherein said at least one sensor comprises:

a temperature sensor for sensing a temperature during operation of said component.

11. The component information unit of claim 9, wherein said at least one sensor comprises: a motion sensor for sensing the movement of said component.

12. The component information unit of claim 9, wherein said at least one sensor comprises:

a strain gauge for sensing strain on a portion of said component.

13. A location trackable construction equipment component assembly, said component assembly comprising:

a construction equipment component;

an attachment point on said component;

a mechanical coupling coupled with said attachment point; and a component information unit coupled with said attachment point via said mechanical coupling, said component information unit comprising:

a movement sensor;

a storage module configured for storing location information regarding said component;

a mesh network device configured for communicating via a wireless mesh network to access and exchange said location information regarding said component in response to an inventory movement of said component such that, upon cessation of said inventory movement detected by said movement sensor, and transmitting a notification message to a component monitor in response to determining a violation of a preset envelop of operation in conjunction with said inventory movement, wherein a location of said component is accessed from a Global Navigation Satellite System (GNSS) receiver of said component monitor accessed via said wireless mesh network and stored within said storage module; and an identification module comprising an identifier associated with said component and configured for identifying said component in association with said communicating such that said identifier is communicated to said component monitor;

wherein said location information is provided to said component monitor in response to a location request received from said component monitor to facilitate location tracking of said component; and wherein said transmitting said notification message is in response to determining a violation of a preset geo-fence associated with said component.

14. The component assembly of claim 13, wherein said attachment point comprises: a structural member of said component.

15. The component assembly of claim 13, wherein said attachment point comprises: a pre-configured attachment point for mechanically coupling with said component information unit.

16. The component assembly of claim 13, wherein said mechanical coupling is selected from the group of mechanical couplings consisting of an adhesive, a magnet, a hook and loop fastener, an adhesive tape, an epoxy, and a plastic line tie.

17. The component assembly of claim 13, wherein said attachment point comprises an attachment point on a crane component.

18. The component assembly of claim 13, wherein said mesh network device is further configured for performing said communicating with said component monitor in response to said component being moved during an inventory movement operation.

* * * * *